United States Patent [19]

Kostin et al.

[11] 3,911,490

[45] Oct. 7, 1975

[54] HEAD DRUM STRUCTURE FOR VIDEO TAPE RECORDER

[76] Inventors: Boris Mikhailovich Kostin, prospekt Dzerzhinskogo, 12, kv. 6; Boris Grigorievich Lapin, ulitsa Industrialnaya, 4, kv. 57; Vladimir Alexandrovich Saburov, ulitsa 1 Shkolnaya, 30, kv. 47; Vladimir Iosifovich Sheikhetov, ulitsa D. Bednogo, 64, kv. 13; Sergei Ivanovich Suvorov, ulitsa Vokzalnaya Magistral, 1, kv. 103, all of Novosibirsk, U.S.S.R.

[22] Filed: Dec. 10, 1973

[21] Appl. No.: 423,529

[52] U.S. Cl. .................... 360/84; 360/10; 360/129; 360/130

[51] Int. Cl.[2] .................. G11B 21/04; G11B 5/10; G11B 15/62; H04N 5/78

[58] Field of Search ....... 360/84, 85, 102, 128, 129, 360/130

[56] References Cited

UNITED STATES PATENTS 3,139,489 6/1964 Lamb .................................. 360/84

3,378,646 4/1968 Shashoua et al. ..................... 360/84

*Primary Examiner*—Bernard Konick
*Assistant Examiner*—R. S. Tupper
*Attorney, Agent, or Firm*—Waters, Schwartz & Nissen

[57] ABSTRACT

A video-tape recorder having a drum with a circular slot wherein at least one video magnetic head is adapted to rotate, said video-head interacting with a tape information carrier movable by means of a capstan from a supply reel to a take-up, reel around said drum and along guides arranged on said drum. In accordance with the present invention there is provided a rotor mounted on the same shaft with the video-magnetic head, said rotor separating the inner space of the drum immediately adjacent the tape information carrier into at least one overpressure space and at least one underpressure space wherein said video-magnetic head is disposed, while the cylindrical wall of the drum in the zone of contact with the tape information carrier is provided with a plurality of perforations through which perforations pressurized air from said overpressure and underpressure spaces of the drum act upon the video information carrier as the rotor rotates to blow away said carrier or to aspirate it to the surface of the drum, thus forming a running loop.

5 Claims, 10 Drawing Figures

HEAD DRUM STRUCTURE FOR VIDEO TAPE RECORDER

The present invention relates to devices for recording video information, and more precicely to video tape recorders.

Known in the art are various types of video tape recorders wherein various methods of imparting relative motion to the video information carrier and the video magnetic head are used for recording video information. Of these devices the most advantageous are video tape recorders with obliqueline recording of video signals by rotating video magnetic heads, wherein the video signals are recorded on a tape carrier as whole frames or half-frames, which thus affords the possibility of a "stop-frame," retarded or accelerated playback of the recorded image to be obtained.

Especially wide possibilities for realizing the variable speed image reproduction are offered by video magnetic tape recorders based on the principle of oblique line recording of a video signal by rotating video magnetic heads on a fixedly arranged tape carrier, since in this case the conditions for the video magnetic head to scan the video tracks recorded on the tape remain constant at any speed of reproduction.

The above video tape recorder is provided with one magnetic recording and reproducing head adapted to rotate in the circular slot of a cylinder-shaped drum around which a tape is helically wound with the help of two guide rollers arranged at different height. The portions of the tape fed on and off the drum are guided at a different height to a vacuum capstan assembly.

At the opposite side of the drum, at the outer wall thereof there is disposed a vacuum cavity and two vacuum brake devices, whereas between the loop of the tape which encircles the drum and the vacuum capstan assembly there are provided in the direction of tape motion a vacuum cavity and vacuum brake devices. The whole system of vacuum cavities, vacuum brake devices and a vacuum capstan assembly are in communicating arrangement with a vacuum distribution manifold (distributor), mounted on the same shaft with the video magnetic head. The same shaft, actuated to rotate by the video magnetic head motor, mounts a vacuum pump which communicates with the vacuum distributor.

A control signal head adapted to read pre-recorded pulses off the tape is disposed adjacent the portion of the tape which is fed to the vacuum capstan assembly, while a video head phase transducer, comprising an illuminator and a photo cell, is disposed on the drum.

In operation, a continuous movement of the magnetic tape past the vacuum capstan assembly is transformed into a pulsating movement of the portin of the tape encircling the drum. This pulsating movement of the tape is effected in increments: as the video magnetic head is reproducing the second half of the magnetic tape loop which encircles the drum, the first half of the tape portion that encircles the drum is incremented by means of the vacuum cavity to form a tape loop disposed between the semicircular portions of the tape wound around the drum, the length thereof being equal to the length of the tape increment; at a time when the video magnetic head is reproducing the first half of the tape loop wound around the drum, the second half is equally incremented simultaneously taking up the slack between the semi-circles so that the video track remains continuous.

The value of increments by which the tape is moved is determined by pre-recorded control signal pulses. The step-wise movement of the magnetic tape is achieved by means of a system of vacuum cavities and vacuum brakes. The system is controlled by the vacuum distributor, videomagnetic phase phototransducer and the control signal head.

However, the prior art video-tape recorder possesses the following inherent disadvantages:

First, the idea underlying the constructional conception of the alternate step-wise movement of the semicircles of magnetic tape predetermines a single-head embodiment of the video-tape recorder, which feature tends to restrict its application, especially when strict continuity of the reproduced video signal is required;

Second, the vacuum-pneumatic incremental tape-moving mechanism utilized in the video tape recorder is rather sophisticated and vacuum distribution is especially difficult to provide from the technological viewpoint.

It is an object of the present invention to obviate the above-mentioned disadvantages.

It is therefore an object of the present invention to provide a simple and reliable mechanism ensuring a simultaneous continuous movement of a magnetic tape from the supply reel to the take-up reel simultaneously with a step-wise or incremental movement of the magnetic tape around the drum, in the absence of friction of the tape against the drum surface.

The above object of the invention is accomplished by a video tape recorder having a cylindrical drum with at least one magnetic head rotating in the circular slot thereof, which drum having helically encircling guides serving to delimit the position of a tape information carrier wound around said drum, which tape carrier being threaded off the supply reel to the take-up reel to wind around said drum, being actuated by a capstan, wherein, according to the present invention there is provided a rotating rotor, mounted on the same shaft with the video magnetic head, said rotor separating the inner space of the drum immediately adjacent said video-information carrier into at least one overpressure space, and at least one underpressure space wherein said video magnetic head is disposed, and the cylindrical wall of the drum in the area of contact with the tape video information carrier is provided with a plurality of perforations through which, as the rotor rotates, air pressure is transmitted from said drum spaces to the video information carrier, whereby said video information carrier is blown away from, or fixedly aspirated to the surface of the drum, thus forming a running loop of the tape video-information carrier.

The rotor is preferably made in the form of two disks, the diameter of each of said disks corresponding to the inner diameter of the drum, and a partition which is adjacent to the inner surface of the drum.

The width of the helical guides on the drum surface can exceed the width of the running loop of the tape video - information carrier.

In an embodiment with a pressurized drum, the rotor is to be made in the form of a stepped partition, separating the inner space of the drum into overpressure spaces and underpressure spaces, the height of the step and its position corresponding to the height and position of the helical guides.

The foregoing and other advantages of the present invention will be apparent from the following more particular description of the preferred embodiments of the invention, as illustrated in the accompanying drawings, wherein.

Figure 1:
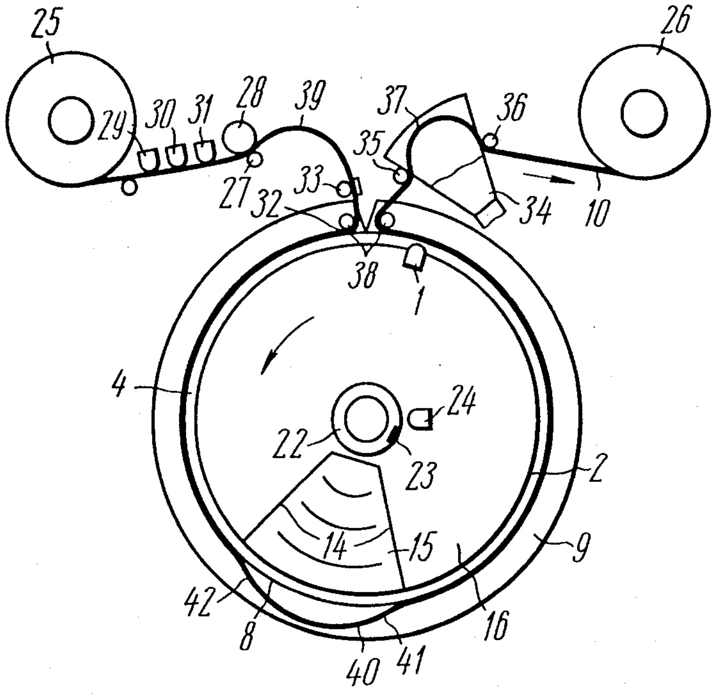
FIG. 1 is a general schematic plan view of a videotape recorder according to the invention.
Figure 2:
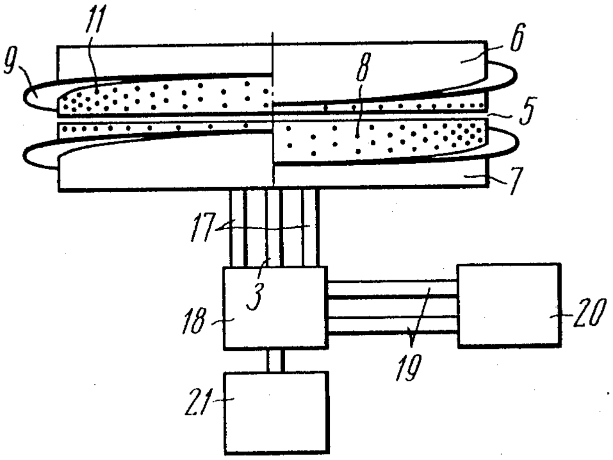
FIG. 2 illustrates the front elevation of a drum for a video-tape recorder according to the invention.

Referring now to FIG. 1, the video magnetic tape recorder according to the invention comprises a video magnetic head 1 in conjunction with a rotor 2, mounted on a common shaft 3 (FIG. 2) and disposed inside a stationary cylindrical drum 4 (FIGS. 1,3), so that as the rotor 2 rotates, the video magnetic head 1 rotates in a circular slot 5 of the drum 4, which slot divides the drum 4 into an upper portion 6 (FIGS. 2 and 3), and a lower portion 7.

An external cylindrical surface 8 of the drum 4 is provided with wide guides 9, helically encircling the cylindrical surface 8. The guides 9 are intended to transversely retain a tape video-information carrier, that is a tape 10, wound around the drum 4 substantially through a 360° angle. The upper portion 6 of drum 4 and the lower portion 7 in the contact zone with the tape 10 (between the guides 9) are provided with a plurality of perforations 11.

The rotor 2 (FIG. 3) disposed inside the drum 4 comprises two disks: an upper disk 12 and a lower disk 13, and a partition 14 connecting said two disks, which partition separates the inner space of the drum 4 between the disks 12 and 13 into an overpressure space 15 (FIG. 1), and an underpressure space 16. Both disks 12 and 13 (FIG. 3) along the periphery thereof, as well as the ends of partition 14, adjoin with a negligible clearance the inner surface of the cylindrical drum 4, thus ensuring minimum air leakage, in other words the least possible loss of pressure in the spaces 15 (FIG. 1) and 16 of drum 4. The video-magnetic head 1 is mounted on a common shaft 3 with the rotor 2 in the underpressure space 16. The overpressure space 15 and underpressure space 16 are in communicating arrangement by means of rotating air conduits 17 (FIG. 2) with a pressure distributor 18 mounted on the shaft 3 of rotor 2, which pressure distributor communicates via stationary air conduits 19 with an air pump 20 which serves for creating overpressure and underpressure.

The shaft 3 of rotor 2 is driven by any conventional means, for example, by motor 21. The shaft 3 also mounts a disk 22 (FIG. 1) with a magnet 23, which magnet, as the rotor 2 moves to occupy a predetermined position, will induce electromotive pulses in the head 24, to be used in the automatic control system (not shown) of the videomagnetic heads motors.

The video tape recorder includes a supply reel 25 and a take-up reel 26.

The tape 10 is actuated to advance by a capstan 27 with a pressure roller 28. While advancing, the tape 10 passes three magnetic heads, namely an erasing head 29, a sound head 30 and a control signal head 31. A braking device 33 is provided at the entrance 32 of tape 10 into the guides 9 of drum 4; and at the exit of the tape 10 from the guides 9 of drum 4 there is provided a mouthpiece 34, with the tape 10 forming a pulsating loop 37 between the guide rolls 35 and 36 thereof. Other guide rolls 38 are provided at the entrance point of the tape 10 into the guides 9, and at the point of exit of the tape 10 from the guides 9. The tape 10 forms an accumulating loop 39 between the capstan 27 and the brake device 33.

On the outer cylindrical surface 8 of drum 4, immediately adjacent the overpressure space 15 the tape 10 forms a running loop 40 having a front portion 41 and a tail portion 42.

The number of video magnetic heads may be increased to eliminate any interruption of the reproduced video-information. It will be appreciated that the number of overpressure and underpressure spaces may also be increased.

Figure 4:
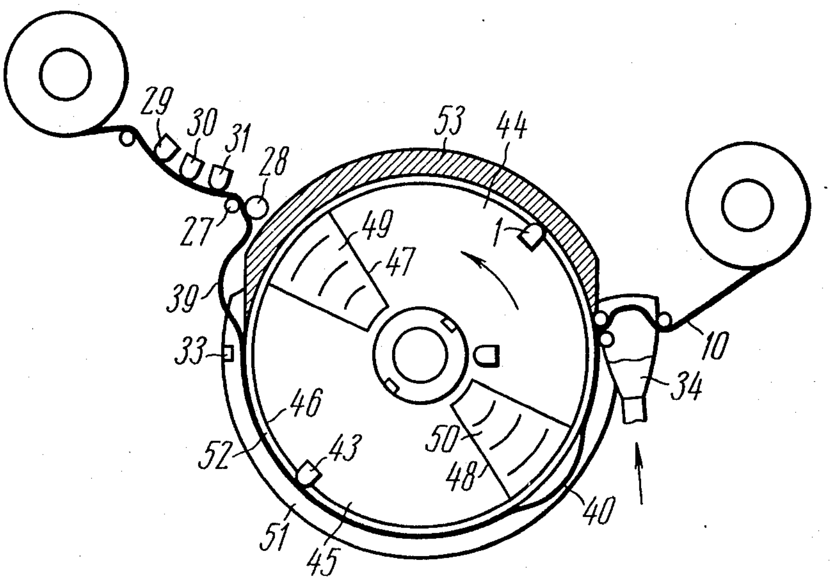
FIG. 4 is a plan view of a video-tape recorder with two video magnetic heads, according to the invention.

FIG. 4 illustrates an embodiment of the video-tape recorder with two video-magnetic heads and having two overpressure spaces and two underpressure spaces. In this embodiment the video-magnetic heads 1 and 43 are disposed substantially diametrically opposite each other, in the underpressure spaces 44 and 45, respectively.

The rotor 46 is provided with two partitions 47 and 48, disposed substantially symmetrically relative to its axis of rotation. By means of these partitions 47 and 48, the overpressure spaces 49 and 50 are separated in the zone immediately adjacent the tape 10 from the underpressure spaces 44 and 45.

Wide guides 51, made in the form of semi-circles, are attached to the drum 52, helically embracing said drum through a 180° angle. In the zone where the tape 10 is wound around the drum 52, lying in the guides 51 at an angle slightly exceeding 180° (FIG. 3), said drum is also provided with a plurality of perforations 11.

Figure 3:
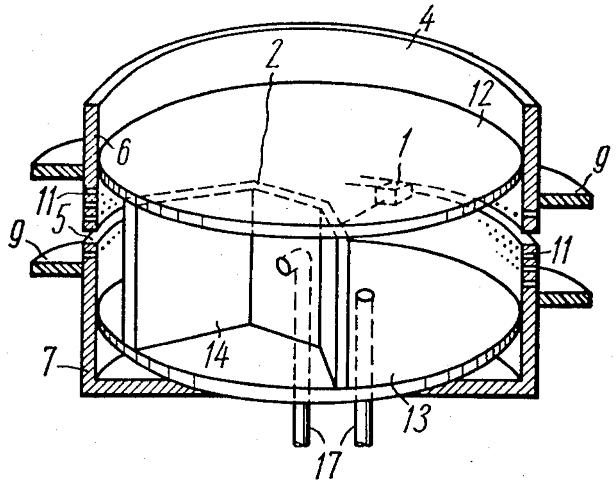
FIG. 3 is a cross section of a drum with rotor, according to the invention.

On the opposite side from the guides 51 (FIG. 4), the drum 52 is provided with a strap 53 which strap perventing air leakage through the circular slot 5 (FIG. 3).

The capstan 27 with pressure roller 28 is provided on the video-tape recorder to advance the tape 10 (FIG. 4).

A braking means device 33 is disposed at the point of entry of the tape 10 into the guides 51, said tape 10 forming an accumulating loop 39 before said braking means 33. A mouthpiece 34 is provided at the exit of the tape 10 from the guides 51.

In the zone where the tape 10 is subjected to the action of overpressure spaces 49 and 50 in the guides 51, there is formed a running loop 40 of tape 10.

Figure 5:
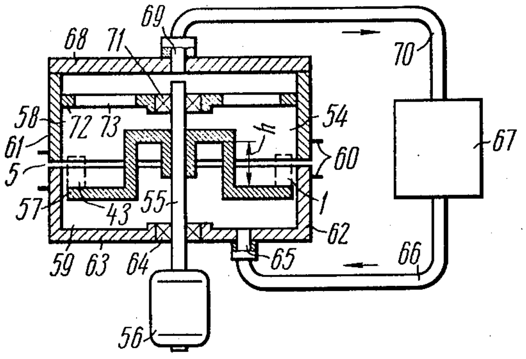
FIG. 5 is another embodiment of a video-tape recorder with a cut-away pressurized drum, according to the invention.

FIG. 5 illustrates an embodiment of the video-tape recorder having a pressurized drum.

In this case a rotor 57 is installed inside the pressurized drum 54, mounted on the shaft 55 of video-magnetic heads 1 and 43, said rotor being driven by an electric motor 56. The rotor 57 is embodied as a stepped partition disposed substantially horizontally and separating the inner space of said pressurized drum 54 into two parts, one being an underpressure space 58 and the other — overpressure space 59.

The rotor 57 is dimensioned for the two spaces 58 and 59 to overlap the whole zone of contact between the external cylindrical surface of drum 54 and the tape 10 disposed in helical guides 60; that is the vertical dimension "*h*" of the step and its position correspond to the height and position of the turn of the tape 10 wound around the drum 54.

The pressurized drum 54 comprises an upper 61 and a lower 62 portions, separated by a circular slot 5. The lower portion 62 of drum 54 has a bottom 63 accomodating a bearing 64 and having an opening 65 for connecting an air conduit 66 intended for supplying overpressure air to the space 59 from a pump 67.

The upper pressure-tight cover 68 is provided with an opening 69 for connecting an air conduit 70 communicating the underpressure space 58 with the air pump 67.

The lower end of shaft 55 is accomodated in a bearing 64 and the upper end of shaft 55 is accomodated in a bearing 71 mounted in a plate 72, which plate is provided with openings 73 for free passage of air.

The rotor 57 disposed in the drum 54 may be embodied in various manners.

The main condition the rotor is to satisfy is in that the inner space of the pressurized drum 54 must be separated into an overpressure space and an underpressure space so that each said space could affect all the zone of contact of the outer cylindrical surface of drum 54 with the tape carrier, that is the whole turn of the tape carrier.

Figure 6:
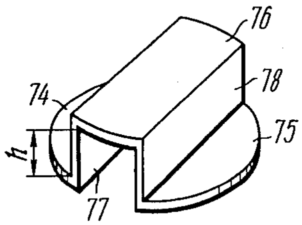
FIGS. 6, 7, 8, 9 and 10 illustrate various embodiments of a rotor, according to the invention.

Th stepped rotor 57, used, for example in the embodiment of a video-tape recorder having two magnetic heads, comprises two elements 74, 75 and 76 of a horizontal disk (FIG. 6), which in combination form a complete disk with the complementary elements spaced apart through a height "*h*" of the step and connected by vertical partitions 77 and 78.

Figure 7:
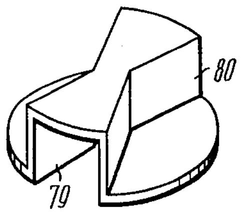
Figure 8:
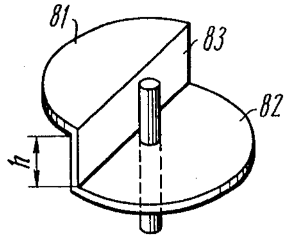
Figure 9:
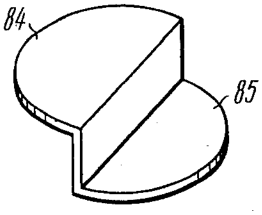
Figure 10:
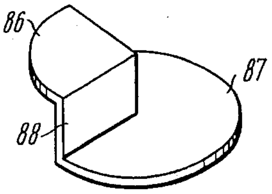

In the stepped rotor shown in FIG. 7 the vertical partitions 79 and 80 are bent plates. The stepped rotor illustrated in FIG. 8 is preferably used in a single head video-tape recorder. It comprises two portions 81 and 82 of a disk which are complementary, forming a complete horizontal disk, with the complementary segments spaced apart through a height "*h*" of the step and connected by a vertical partition 83. The partition 83 may be made inclined, while the portions 84 and 85 (FIG. 9) of the horizontal disk may be equal. The portions 86 and 87 (FIG. 10) of the horizontal disk making up the rotor are made as two sectors complenting each other to a full circle and connected, along the radii delimiting these sectors, by vertical partitions 88. These partitions may also be made inclined.

The video-tape recorder according to the invention operates as follows.

The rotor 2 (FIG. 1), together with the video-magnetic head 1 disposed in the underpressure space 16, is rotated by the electric motor 21 (FIG. 2) at a speed which is determined by the frame frequency or half-frame frequency of the input video-signal, said speed remaining constant throughout all modes of operation. The phase of rotation of the rotor 2 is adjusted by a conventional system of automatic control (not shown in the Figures) of the videoe-magnetic head motor with the aid of magnet 23 mounted on the disk 22 (FIG. 1) and the head 24, in a structly definite time relationship with the frame synchronizing pulses of the input video-signal.

Let us first discuss the operation of the video-magnetic tape recorder in the recording mode. In this mode of operation the braking device 33 is deactivated. Air over pressure from the air pump 20 (FIG. 2) enters the space 15 of drum 4, whereas the same pump 20 creates a slight rarefaction in the space 16. The effect of different values of air pressure in spaces 15 and 16 is transmitted to the tape 10 via a plurality of perforations 11 (FIG. 2 and 3) and the circular slot 5 in such a manner that the tape 10 in the active zone of the underpressure space 16 is fixedly aspirated to the outer surface 8 of drum 4, whereas in the active zone of the overpressure space 15 it is blown away from the surface 8 of drum 4.

The speed of tape 10 is determined by the speed of the capstan 27 which is constant in this mode of operation. The capstant 27, uniformly rotating, continuously feeds the tape 10 to the entrance 32 in the guides 9. However, as the rotor 2 turns to occupy the position when the underpressure space 16 is at the entrance 32 in the guides 9, the tape 10 will be fixedly aspirated to the surface 8 of drum 4, resulting in a loop 39 of the tape 10 accumulating at the entrance 32 into the guides 9, being continuously fed by the capstan 27.

The overpressure space 15, when at the entrance 32 of the tape 10 into the guides 9, acts upon the accumulated loop 39 of tape 10 to expand it to form a kind of "bubble" of tape 10 in the guides 9. As the rotor 2 rotates further, the front portion of the accumulating loop 39 advances together with the overpressure space 15 and the accumulating loop 39 itself somewhat increases in size due to the continuous feeding of the tape 10 to the entrance 32 into the guides 9. As the front portion of the underpressure space 16 approaches entrance 32 into guides 9, the tape 10 will again be aspirated to the surface 8 of drum 4 (at the entrance 32 into the guides 9). At the same instant the tail portion 42 of the thus formed running loop 40 of tape 10 takes shape, that is the tail portion of the tape wave which, having been separated from the newly accumulating loop 39 of tape 10 at the entrance 32 and assumed its normal shape, advances over the external surface 8 of drum 4 in the guides 9 synchronously together with the movement of overpressure space 15. The mouthpiece 34 assists the running loop 40 of tape 10 to come off the surface of drum 4, a pulsating loop 37 of tape 10 being formed between the rolls 35 and 36 of the mouthpiece 34 by pressurized air, to be uniformly taken up by the take-up reel 26.

After each running loop 40 of tape 10 makes a circle around the drum 4, the tape 10 fixedly aspirated to the surface 8 of drum 4 advances through a recording step without any friction or rubbing against the said surface.

At the same time the video magnetic head 1 mounted on the common shaft 3 with the rotor 2 in the underpressure space 16, will come into contact with the fixedly aspirated tape 10 on the surface 8 of drum 4 and will record a frame (or half-frame) of a video-signal on the non-advancing tape 10. The electromotive force pulses induced by the magnet 23 in the head 24, informing the automatic control system of the motor 21 of the video-magnetic head 1 on the phase of the video-magnetic head 1 relative to the synchronizing frame pulses of the input video signal, are recorded as control signal marks on a special track of the tape 10.

The operation of the video tape recorder in the playback mode is distinguished from the operation in the recording mode only in that the speed of capstan 27 is controlled by the automatic tape advance control system in such a manner that the pulse of the control signal mark reproduced by the magnetic head 31 is in the same time correlation with the e.m.f. pulse induced in the magnetic head 24 as when the video signal was recorded. In this case all other conditions that existed when the record was made will be retained and the video magnetic head 1 will be aligned with the video track.

When the video magnetic tape recorder operates in the mode of reproducing an arrested image the brake device 33 is actuated and the video magnetic head 1 reproduces from the fixed turn of the tape 10 one and the same video track, that is one and the same frame (or half-frame) of the television image.

In the mode of reproduction of an image retarded by an integer, the capstan rotates at a speed which is lower that its rated speed by the factor selected. In this case the braking device 33 is activated and the retarded accumulation of loop 39 takes place until the control signal mark pulse, reproduced from the tape 10 by the control signal magnetic head 31, trips the braking device 33 for a period of time which is less than the period of rotation of the video magnetic head 1 but more than the period of time the overpressure space 15 passes the entrance 32. Now a running loop 40 of tape 10 will run in the guides 9 over the surface of drum 4, said loop having its normal size, and the turn of tape 10 wound around the drum 4 will be advanced over an increment of the tape 10. The formation of running loop 40 and the corresponding change of reproduced frames or half-frames will be slower by the selected factor, rather than to occur during each full rotation of the rotor 2 (and the video magnetic head 1).

In the video tape recorder operation mode involving an image reproduction accelerated by an integer, the brake device 33 is completely deactivated. The rotary speed of the capstan 27 will be higher by the selected factor and, correspondingly, the tape 10 will advance at a greater speed, therefore the accumulated loop 39 will increase and in the maximum position it will exceed its normal size by the selected factor. As a result, the size of the running loop 40 of tape 10 will also increase, the tape advance increment increasing accordingly (by the selected factor), and the video magnetic head 1 will reproduce with the desired interval, rather than reproduce each video track, that is each frame or half-frame of the television image.

The video tape recorder having two video-magnetic heads, illustrated in FIG. 4 operates generally in the same manner as the above-described video-tape recorder having one video-magnetic head. The rotary speed of rotor 46 is equal to the frame frequency of the input video-signal.

The video-magnetic heads 1 and 43 perform the recording or reproduction of video signal half-frames on the tape 10, which envelopes in a semi-circle the drum 52 through an angle which somewhat exceeds 180° to ensure mutual overlapping of the video information recorded by the video magnetic heads 1 and 43, the result being that the video-tape recorder of the above design reproduces information without intervals. Each half-turn of the rotor 46, a running loop 40 of tape 10 runs in the guides 51, and the half-ring of the tape 10 embracing the drum 52 is advanced through an increment.

In all other respects the operation of a video-magnetic tape recorder having two video-magnetic heads is similar to the operation of a video-tape recorder with one video-magnetic head. The operation of a video-tape recorder with a pressure-tight drum shown in FIG. 5 is distinguished in that the rotor 57, embodied as a stepped partition horizontally mounted on the shaft 55 and disposed inside the pressure-tight drum 54, switches, when rotating, the action of the underpressure space 58 and the overpressure space 59, which said rotor separates, exerted on the turn of the tape 10, wound around the drum 54 in the guides 60.

As a result, a running loop of said tape is formed and runs in the guides 60 in the zone where the overpressure space 59 acts upon the tape 10.

The overpressure in the space 59 and underpressure in the space 58 are created by the air pump 67, communicating via the air conduits 66 and 70 with the pressure-tight drum 54 in such a manner that the space 59 receives overpressure air via the conduit 66, while air is sucked out of space 58 via the conduit 70.

The video-tape recorder according to the present invention ensures high fidelity reproduction not only at a rated speed, but also of still, retarded and accelerated television images. Owing to the air gap "lubrication" between the tape and the outer surface of the drum, friction of the tape against the drum in the rewinding mode is substantially reduced.

Any non-stability of tape movement within a frame or half-frame of a television image does not affect the time-scale stability of the reproduced video information.

What we claim is:

1. An oblique line-recording video tape recorder comprising a supply reel to supply a tape video-information carrier, a take-up reel to store said tape, a stationary cylindrical drum positioned intermediate said supply and take-up reels, helical guide projections being provided on the surface of said drum defining therebetween a helical path for said tape about the circumference of said drum, a circumferential slot in said drum within the said defined path, a plurality of perforations formed in said drum within said defined path, a rotatable shaft coaxially mounted within said drum, at least one video magnetic-head carried by said shaft for rotation therewith within said circumferential slot and projecting beyond the exterior circumferential surface of the drum, a rotor carried by said shaft for rotation therewith, said rotor being rotatable within said drum and dividing the interior thereof at least over the peripheral area of the drum coextensive with said defined path into at least one overpressure zone and at least one underpressure zone, said video magnetic-head being maintained within said underpressure zone, means for supplying pressurized gas to said overpressure zone and means for reducing the pressure within said underpressure zone, an air bearing support for said tape being thus formed over the circumferential extent of said overpressure zone and a predetermined suction pressure adapted to aspirate said tape into contact with the underlying surface of the drum in underpressure zone means for rotating said rotatable shaft, and means for withdrawing said tape from said supply reel for recording of the information thereon by said video magnetic-head and for winding upon said take-up reel at a predetermined rate, whereby rotation of said shaft and rotor effectuates the development of said air bearing which rotates together with the underlying overpressure zone while said video magnetic-head comes into contact with only the section of the tape aspirated against the surface of the drum by the suction pressure within said underpressure zone.

2. A video tape recorder according to claim 1, wherein said helical guide projections have a depth at least as great as the depth of said air bearing.

3. A video tape recorder according to claim 2, wherein said rotor comprises an upper disc and a lower disc mounted coaxially on said shaft, the periphereal portions of said discs being in close proximity to the inner surface of said drum so as to define a minimal clearance therebetween to thus minimize the loss of gas, at least one partition connected between said discs to thereby define said over pressure zone and provide said underpressure zone.

4. A video tape recorder according to claim 1, wherein the sections of said drum above and below said circumferential slot are gas-tight.

5. A video tape recorder according to claim 4, wherein said rotor is made in the form of a stepped partition disposed substantially horizontally and separating the inner space of said drum into two zones, one of said zones being said overpressure zone and the other of said zones being said underpressure zone, the height and position of the stepped portion of said partition corresponding to the height and position of that portion of said defined path which is coextensive with said overpressure zone.

* * * * *